J. ANDREATTE.
PAY-AS-YOU-ENTER GATE OR TURNSTILE.
APPLICATION FILED SEPT. 19, 1916.

1,221,268.

Patented Apr. 3, 1917.
3 SHEETS—SHEET 1.

Inventor
J. Andreatte
By Victor J. Evans
Attorney

Witnesses
E. R. Ruppert

J. ANDREATTE.
PAY-AS-YOU-ENTER GATE OR TURNSTILE.
APPLICATION FILED SEPT. 19, 1916.

1,221,268.

Patented Apr. 3, 1917.
3 SHEETS—SHEET 2.

Inventor
J. Andreatte
By Victor J. Evans
Attorney

Witnesses

J. ANDREATTE.
PAY-AS-YOU-ENTER GATE OR TURNSTILE.
APPLICATION FILED SEPT. 19, 1916.
1,221,268.
Patented Apr. 3, 1917.
3 SHEETS—SHEET 3.
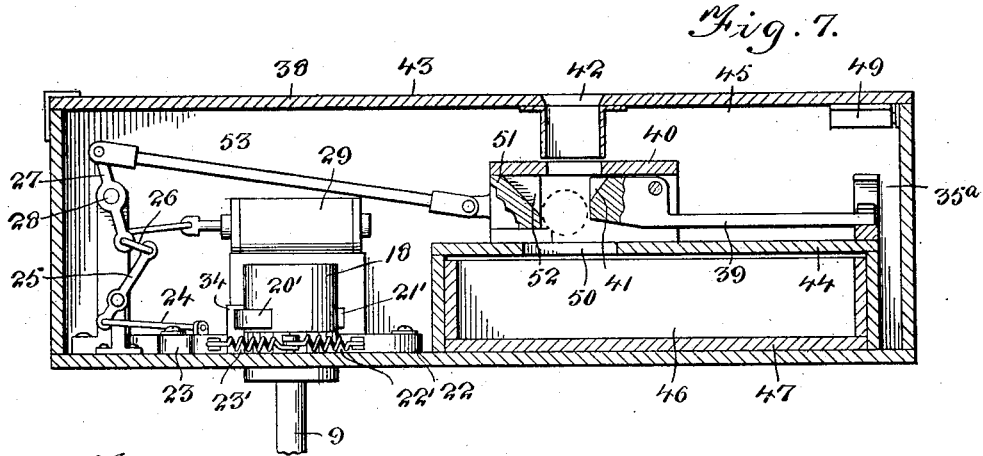
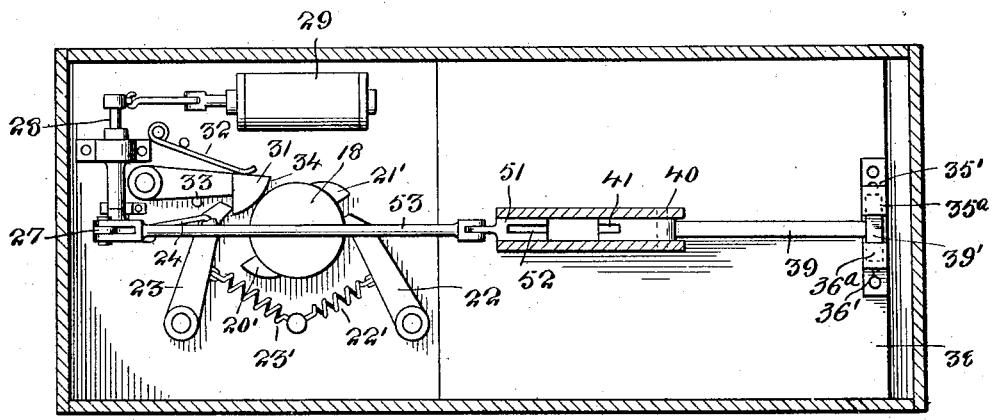
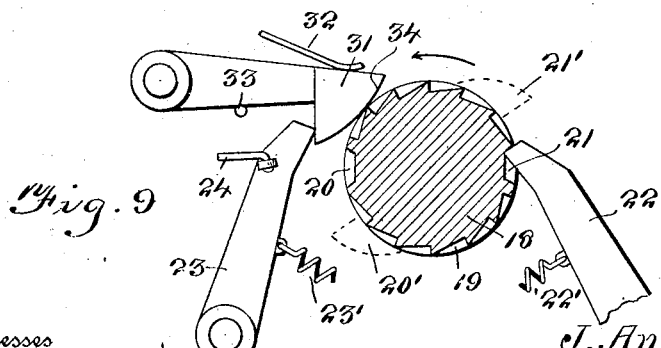
Inventor
J. Andreatte
By Victor J. Evans
Attorney
Witnesses

UNITED STATES PATENT OFFICE.

JOSEPH ANDREATTE, OF OAKDALE, CALIFORNIA.

PAY-AS-YOU-ENTER GATE OR TURNSTILE.

1,221,268.   Specification of Letters Patent.   Patented Apr. 3, 1917.

Application filed September 19, 1916. Serial No. 120,988.

*To all whom it may concern:*

Be it known that I, JOSEPH ANDREATTE, a citizen of the United States, residing at Oakdale, in the county of Stanislaus and State of California, have invented new and useful Improvements in Pay-As-You-Enter Gates or Turnstiles, of which the following is a specification.

This invention relates to a pay-as-you-enter gate or turnstile, particularly designed and intended for use in governing the entrances of amusement parks or resorts, theaters, and other similar public places where a fixed charge is made for admission, the object of the invention being to provide a gate or turnstile which normally closes the entrance passage but is automatically operated, upon the deposit of a prescribed coin, to permit a single person to enter at a time, thus obviating the necessity of employing an attendant at the gate or entrance way.

A further object of the invention is to provide a pay-as-you-enter gate or turnstile which is simple of construction, reliable and efficient in operation, proof against any ordinary attempts at fraud or entrance without pre-payment of the prescribed coin, and which embodies a reliable and efficient type of coin controlled locking and releasing mechanism governing the action of the gate.

With these and other objects in view, the invention consists of the features of construction, combination and arrangement of parts hereinafter fully described and claimed, reference being had to the accompanying drawings in which:—

Fig. 5 is a similar view showing the parts in released position.

Figs. 6 and 7 are vertical and horizontal sections, respectively, showing the parts of the coin-controlled starting and motor controlled releasing elements in the respective positions they occupy with the parts arranged as in Figs. 4 and 5.

Figs. 8 and 9 are enlarged plan sections showing the parts of the gate locking mechanism in the respective positions occupied thereby in the arrangement of the parts shown in Figs. 4 and 5, the locking head appearing in section in the plan of the locking teeth and the trip cams indicated in dotted lines.

Figure 1:
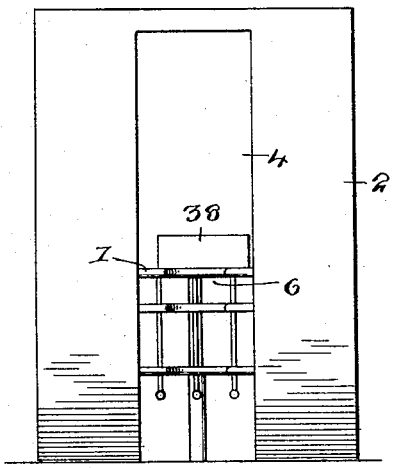
Figure 1 is a front view of the gate or turnstile.

In carrying my invention into practice, I provide a rotary gate or turnstile 1 which is arranged within a suitable gate house or inclosure 2, which is provided upon the interior thereof with a circular chamber 3, in which the gate is disposed, said chamber having passages 4 and 5 at diametrically opposite sides, either of which may serve as an entrance and the other as an exit. The gate 1 controls the passage of individuals between the passages 4 and 5, serving in the illustrated exemplification as an outer entrance door, or the exit from the inclosure 2 into the amusement or other place, said gate serving as a barrier but capable of being revolved in one direction, through a semi-circular arc on each actuating motion, to permit a person to pass from the entrance 4 to the exit 5, or vice versa. To this end the gate is provided at diametrically opposite sides with spaces or recesses 6 and 7 which may be occupied by a person passing from one point to another in the revolution of the gate.

The gate proper 1 may be of any suitable construction, and made of any suitable material, it being only necessary to the proper operation of the device that it be of proper form and dimensions to prevent the passage of persons through the inclosure 2 at all times except when the gate is operated to permit passage of such persons. The gate is mounted for revolution upon the reduced upper end 8 of a stationary post or shaft 9 having its enlarged lower end 10 embedded beneath the floor or ground line in a base 11 of concrete or other suitable material, in which may also be embedded or invested reinforcing elements 12. The gate is mounted to turn on the part 8 of the axle on suitable anti-friction ball or roller bearings 13 and 14, and is held from relative displacement on the shaft by collars 15 and 16 which may constitute elements of the bearing devices and are fixed against movement by set screws 17.

Figure 2:
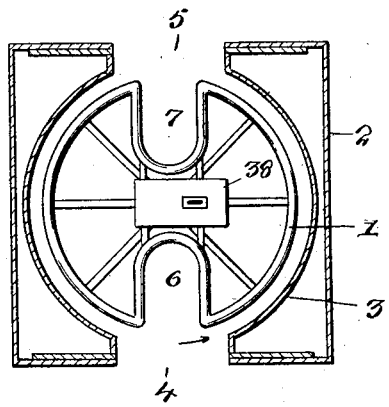
Fig. 2 is a sectional plan view thereof.
Figure 3:
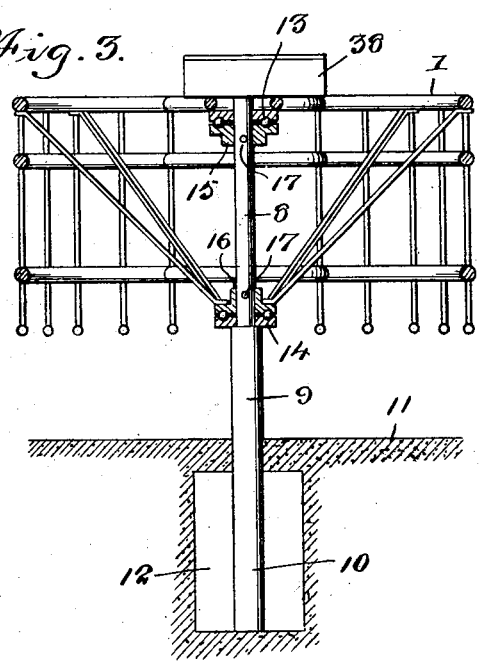
Fig. 3 is a sectional view through the gate, showing particularly the support on which the gate is revolubly mounted.
Figure 10:
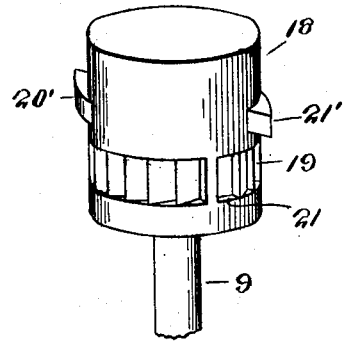
Fig. 10 is a perspective view of the locking head.
Figure 6:
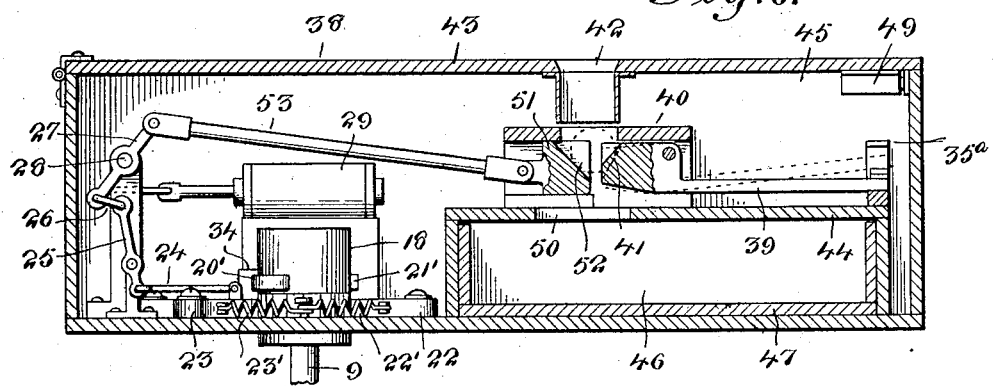
Figure 4:
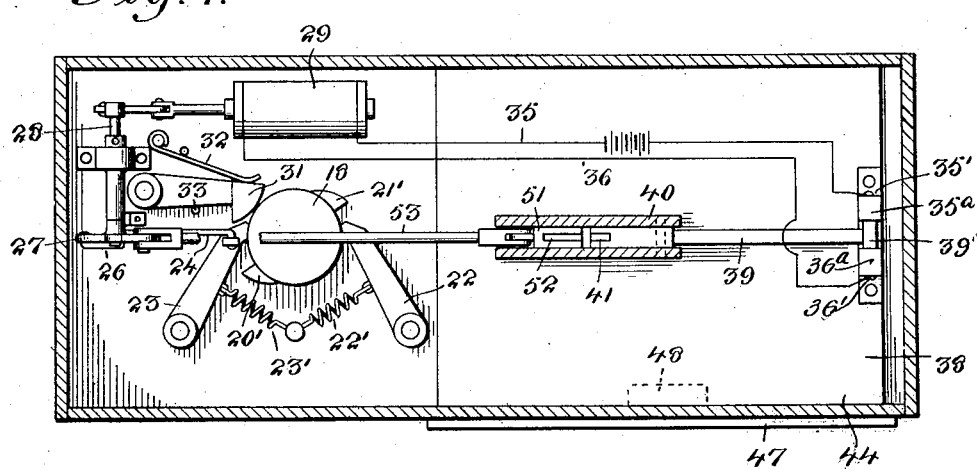
Fig. 4 is a sectional plan view through the inclosing casing of the gate locking and releasing mechanism, showing the parts in normal or locking position.
Figure 8:
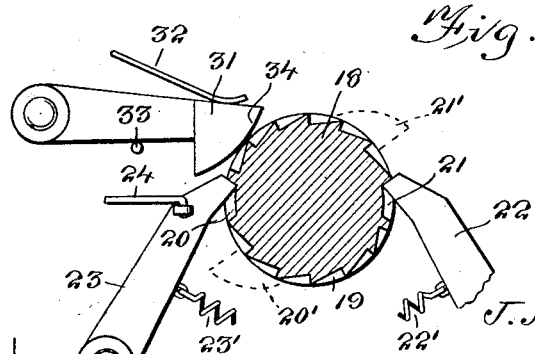

The axle or post 9 is provided at its upper end with a locking head 18, which may consist, of a cap secured thereon and keyed or otherwise fixed thereto or may be formed by an integral part of the axle. This locking head is provided with an annular series of ratchet teeth 19, a pair of diametrically opposite locking teeth 20 and 21, interposed between certain of the ratchet teeth, and serving also as ratchet teeth, and a pair of trip lugs or cams 20' and 21'. The ratchet teeth 19 are arranged for coöperation with a check pawl or dog 22 operating to hold the table or turnstile against retrograde rotation and held in contact with the ratchet teeth by a spring 22'. This dog allows the gate to be turned in one direction only, as indicated by the arrow in Fig. 2, the gate having a revoluble motion in the left hand direction. A locking dog or pawl 23 is provided, which is adapted to ride over the ratchet teeth but serves to engage the locking teeth 20 and 21, to positively lock the gate at each half revolution in its turning motion, in which the recesses 6 and 7 register with the entrance 4 and exit 5, or vice versa, said locking dog or pawl being normally held in locking position by a spring 23'. The dogs or pawls 22 and 23 may be mounted or supported pivotally in a casing 38 which is mounted on the gate and which constitutes a housing for certain parts of the operating mechanism and within which the locking head 18 carried by the shaft or post 9 extends.

The dog or pawl 23 is coupled by a link 24 to one end of a transmission lever 25, which is connected at its opposite end to one end of a link 26, the opposite end of which is coupled to one arm of an actuating lever 27 carried by a rock shaft 28, which shaft is adapted to be rocked in one direction by means of an electro-magnet 29 to retract the locking dog through the medium of the connections above described, the parts being returned to normal position after actuation by the spring 23'.

Provided for coöperation with the locking dog is a pivoted latch or lip 31 to engage the free end or tooth of the dog 23 when the latter is retracted, to hold said dog in a retracted position while the gate is making a turning motion of half a revolution. The latch is normally held in position for action by a pressure spring 32 which holds said latch against a stop 33, the said latch or lip 31 being provided with a beveled face 34 adapted to be engaged in succession by the lugs or cams 20' and 21' to retract the latch and effect the release of the locking dog for return to normal locking position after retraction.

The magnet 29 is arranged in an electric circuit including conductors 35 and 36, one of which is connected with a binding post 35', connected with and insulated from a coin box or receptacle 38 mounted upon the gate and in electrical connection with the contact 35ª, which contact 35ª is adapted to be engaged by a contact 39' upon one end of an intermediately pivoted, vertically movable switch lever 39. The other conductor 36 leads from the magnet 29 and is connected with a binding post 36' also connected with and insulated from the coin box 38 and in electrical connection with the contact 36ª, which contact is also adapted to be engaged by the contact 39' on the switch lever 39 so that when the lever 39 is tilted by the inserted coin, contact 39' will bridge the contacts 35ª and 36ª and the circuit of the magnet will be closed. The arm of the lever carrying said contact 39' is normally held depressed by gravity to hold said contact 39' out of engagement with the contacts 35ª and 36ª and thus maintain the electric circuit in a broken or inoperative condition. The opposite arm or end of the lever 39 is mounted for movement within a coin chute 40 and provided in its free edge with a coin receiving slot or recess 41, the said slotted end of the lever forming a detent and trip member for arresting the movement of a coin inserted into the chute through a coin insertion slot 42, so that the weight of the coin will tilt said lever and thus move the contact 39' into engagement with the contacts 35ª and 36ª to close the electric circuit. The slot 42 is arranged in the top 43 of the box or receptacle 38, which is provided with a partition 44 supporting the switch mechanism above described and subdividing said box into upper and lower compartments 45 and 46, the compartment 45 forming a chamber for the reception of the switch mechanism while the compartment 46 is adapted to receive a coin receiving drawer 47, normally fastened in closed position by a suitable lock 48. The top 43 of the box may be in the form of a hinged or pivoted cover normally held in closed position by a lock 49, the construction being such that neither the coin drawer nor the coin mechanism containing compartment of the box can be had access to except by a person possessed of the proper kind of key.

The chute 40 communicates at its lower end with a coin discharge opening 50 extending through the partition 44 for the discharge of the coins into the coin drawer 47, and slidably mounted in said chute in opposing relation to the slotted end of the switch lever 39 is a coöperating detent 51 provided with a receiving slot 52 and coupled by a connected rod 53 with the opposite arm of the actuating lever 27. When the parts are in normal position the slotted detents lie in the path of the coin dropping into the chute and arrest the downward motion of said coin and, if the coin is of the proper denomination, to receive and hold the coin, the weight of which tilts the switch lever to close the switch of the magnet circuit, thus throwing said circuit into action, the detents maintaining the prescribed position until the detent 51 is moved outward by the motion of the actuating lever 27 through the operation of the magnet and whereby the locking dog is retracted and latched to permit the gate to be turned, the retraction of said detent 51 allowing the coin to drop through the opening 50 down into the coin drawer. The switch lever being thus released from the weight of the coin returns to normal position and thus breaks the electric circuit, thus disposing the remaining parts of the working mechanism for return to normal position under the action of the spring 23'.

It will be understood that when the actuating lever 27 is rocked on its working motion it retracts the locking dog 23 and detent 51 simultaneously and, the latch 31 being projected by this spring, the locking dog is held in retracted position to permit the gate to be turned for the passage of a person through the gateway. Immediately after the parts are so set or disposed, the acting lug or cam 20' or 21', as the case may be, lying in rear of the lip of the latch in the direction of rotation of the gate, comes in contact with said lip and retracts the latch, whereupon the parts are returned to normal position, as described, by the spring 23', the locking dog, however, riding over the ratchet teeth on the supporting post or axle until it comes into alinement with one of the locking teeth 20 or 21, whereupon the dog will engage said locking tooth and thus lock the gate against further revolution. It will be evident that the two sets of locking teeth and lugs or cams are provided for locking and latch releasing actions alternately on each half revolution of the gate, so that a person approaching the gate and entering the outer receiving space thereof may, by the deposit of a proper coin, release the gate for movement and turn and travel with the gate a distance of a half revolution from the inlet to the exit end of the passage way, or vice versa, without interference, the gate however automatically locking on making each complete working movement or half revolution to prevent fraudulent operation thereof or any liability of displacement of the parts whereby the purpose of the locking and controlling mechanism might be defeated. It will also be evident that as the magnet is used but a short period of time for the simple purpose of retracting the latch, the cost of operation is almost *nil*.

From the foregoing description, taken in connection with the drawings, the construction and mode of use of my improved pay-as-you-enter gate or turnstile will be readily understood, and it will be seen that the invention provides a gate or turnstile which is not only simple of construction and reliable and efficient in operation, but which may be manufactured, installed and operated at a comparatively low cost. By the use of the gate the entrance to a place of amusement or other place may be properly guarded while those desiring to enter may do so upon payment of the prescribed rate of admission, the gate being entirely automatic in action so that the services of an attendant may be dispensed with. While the construction disclosed is preferred, it is to be understood that changes and modifications falling within the scope of the appended claims may be made, without departing from the spirit or sacrificing any of the advantages of the invention.

I claim:—

1. In a device of the class described, the combination of a shaft, a gate mounted for rotation thereon, a locking head carried by the shaft and provided with ratchet teeth and locking teeth, a pawl coöperating with the ratchet teeth and locking teeth to hold the gate on retrograde rotation, a pawl coöperating with the locking teeth for locking the gate against rotation in stated positions, said pawls being carried by the gate, means for retracting the second named pawl, means for locking said second named pawl in retracted position, and means for rendering said locking means inoperative at stated periods to permit the pawl to move into engagement with the locking teeth.

2. In a device of the class described, the combination of a shaft, a gate mounted for rotation thereon, a locking head carried by the shaft and provided with ratchet teeth and locking teeth, a pawl acting upon the ratchet teeth for holding the gate against retrograde rotation, a pawl arranged for coöperation with the locking teeth to lock the gate in stated positions, said pawls being carried by the gate, means for retracting and releasing the second named pawl, a locking device for engaging and holding said second named pawl in released position after having been retracted and released by the aforesaid means, and means on the head for disengaging the locking device from the latch at predetermined points in the movement of the gate.

3. In a device of the class described, the combination of a shaft, a gate mounted for rotation thereon, a head carried by the shaft and provided with ratchet teeth and with locking teeth, a pawl coöperating with the ratchet teeth to hold the gate from retrograde rotation, a pawl coöperating with the locking teeth to lock the gate from movement in stated positions, said pawls being carried by the gate, means for retracting the second named pawl, a latch to engage and hold the same retracted, and cam devices on the locking head for engaging said latch and retracting the same to release the locking pawl at stated intervals.

4. In a device of the class described, the combination of a shaft, a gate mounted for rotation thereon, a locking head carried by the shaft and provided with ratchet teeth and locking teeth, a pawl coöperating with the ratchet teeth to hold the gate from retrograde rotation, a pawl coöperating with the locking teeth to lock the gate against motion in stated positions, said pawls being carried by the gate, means including a rock shaft for retracting and releasing the locking pawl, a latch to engage and hold the locking pawl released when so retracted and released by the aforesaid means, and cam devices on the locking head for engaging and retracting the latch at stated intervals to permit the return of the locking pawl to locking position.

5. In a device of the class described, the combination of a shaft, a gate mounted for rotation thereon, means for permitting the rotary motion of the gate in one direction and preventing rotation of the gate in the opposite direction, means for locking the gate against rotation in stated positions, said means including coöperating elements carried by the shaft and the gate, the means carried by the gate including a retractable element, means for retracting said element, and means for locking the same in retracted position; and means also carried by the shaft for rendering said last-mentioned locking means inoperative at stated periods.

In testimony whereof I affix my signature.

JOSEPH ANDREATTE.

Copies of this patent may be obtained for five cents each, by addressing the "Commissioner of Patents, Washington, D. C."